J. M. BUCKNER.
Draft-Equalizer.
No. 168,370. Patented Oct. 5, 1875.
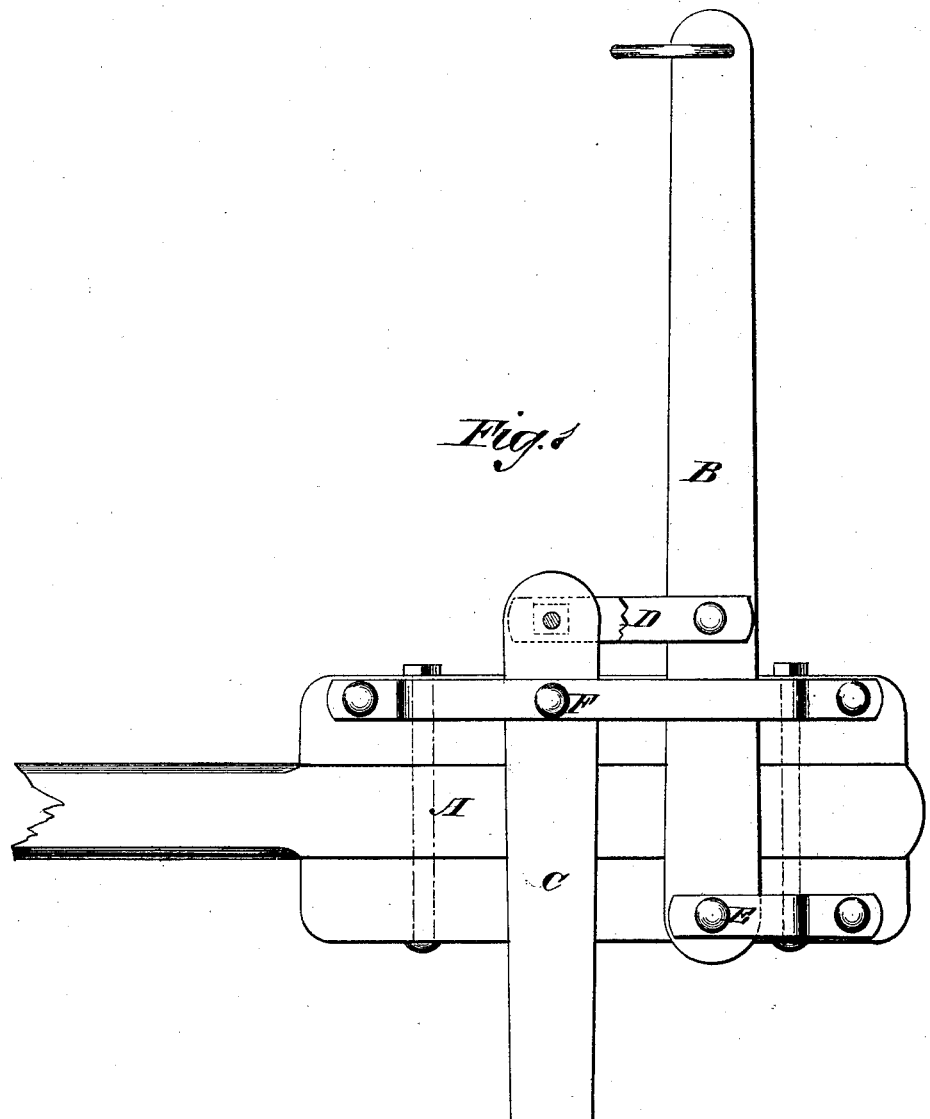
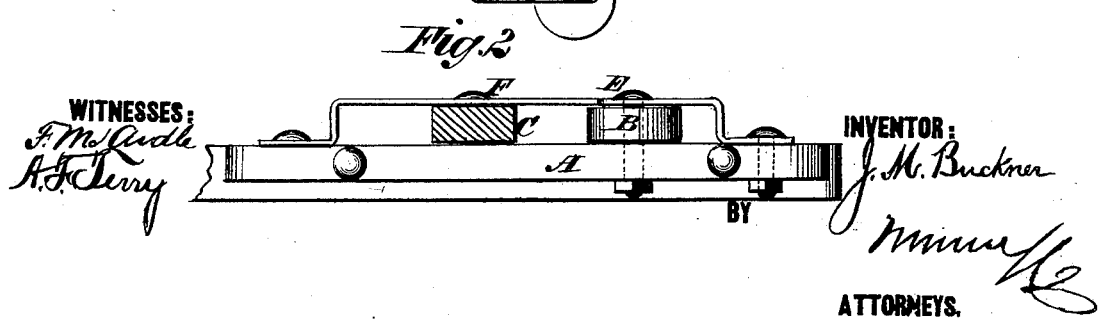
WITNESSES:
F. McArdle
A. F. Terry
INVENTOR:
J. M. Buckner
BY
ATTORNEYS.

UNITED STATES PATENT OFFICE.

JAMES M. BUCKNER, OF SALEM, NEBRASKA.

IMPROVEMENT IN DRAFT-EQUALIZERS.

Specification forming part of Letters Patent No. 168,370, dated October 5, 1875; application filed June 19, 1875.

*To all whom it may concern:*

Be it known that I, JAMES M. BUCKNER, of Salem, in the county of Richardson and State of Nebraska, have invented a new and Improved Three-Horse Evener, of which the following is a specification:

My improved three-horse evener consists of a long lever on the side for the two horses, and a short lever on the side for one horse, pivoted to the tongue, and coupled together by connecting the short arm of the short lever to the long arm of the long one in such manner that the one horse has the necessary leverage to counterbalance the two horses.

Figure 1 is a plan of my improved three-horse evener, and Fig. 2 is a side elevation and section of the short lever.

Similar letters of reference indicate corresponding parts.

A is the tongue; B, the long lever for the two horses; C, the short one for the one horse; and D, the coupling connecting the two levers. The long lever is pivoted to the tongue at E, and the short one at F. From F to the coupling D and from coupling D to the pivot E the distances are contrived to afford the one horse power to counterbalance the two horses, so that three can work together as evenly as two in the ordinary arrangement.

It will be perceived from the drawing that the fulcrums E F are placed on opposite sides of the pole, and at an equal distance therefrom, while the levers are connected at an equal distance from the power-end of each by a strap or coupling, D. This gives, not only the requisite leverage to the single horse to counterbalance the other two, but so compacts the arrangement of parts that this equalizer can be conveniently applied to harvesters, for which it is particularly intended, and to any vehicle that requires three horses abreast; hence,

What I claim as new, and of my invention, is—

The two-horse lever B, pivoted at its end, so that both horses will stand on the same side of pole, in combination with the one-horse lever C, pivoted at a point intermediate between its two ends, so that the third horse will stand on the other side of pole, and the strap D, connecting the end of the single-horse lever with a point on the two-horse lever intermediate between the fulcrum and power-end, all substantially as set forth.

JAMES M. BUCKNER.

Witnesses:
A. J. CURRENCE,
J. VAN DEVORST.